(12) United States Patent
Park et al.

(10) Patent No.: US 8,422,834 B2
(45) Date of Patent: Apr. 16, 2013

(54) SEMICONDUCTOR INTEGRATED CIRCUITS INCLUDING OPTOELECTRONIC DEVICE FOR CHANGING OPTICAL PHASE

(75) Inventors: Jeong-Woo Park, Daejeon (KR); Gyung-Ock Kim, Seoul (KR); Mi-Ran Park, Daejeon (KR); Jong-Bum You, Seongnam (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 319 days.

(21) Appl. No.: 12/746,167

(22) PCT Filed: Jun. 3, 2008

(86) PCT No.: PCT/KR2008/003103
§ 371 (c)(1),
(2), (4) Date: Jun. 3, 2010

(87) PCT Pub. No.: WO2009/072709
PCT Pub. Date: Jun. 11, 2009

(65) Prior Publication Data
US 2010/0278477 A1   Nov. 4, 2010

(30) Foreign Application Priority Data
Dec. 7, 2007  (KR) .................. 10-2007-0126708

(51) Int. Cl.
G02F 1/035 (2006.01)
G02F 1/295 (2006.01)
G02B 6/10 (2006.01)
G02B 6/12 (2006.01)

(52) U.S. Cl.
USPC ............ 385/3; 385/1; 385/2; 385/4; 385/8; 385/9; 385/10; 385/14; 385/15; 385/37; 385/40; 385/129; 385/130; 385/131; 385/132

(58) Field of Classification Search ............. 385/2, 3, 385/8, 9, 10, 132
See application file for complete search history.

(56) References Cited

U.S. PATENT DOCUMENTS 5,757,986 A    5/1998  Crampton et al.
6,298,177 B1 * 10/2001 House ........................ 385/3
(Continued)

FOREIGN PATENT DOCUMENTS
EP  0 433 552 A2   6/1991
JP  06-069602 A    3/1994
(Continued)

OTHER PUBLICATIONS

C.Z. Zhao et al., "Silicon on insulator Mach-Zehnder waveguide interferometers operating at 1.3 μm," Applied Physics Letters, Oct. 23, 1995, pp. 2248-2249, vol. 67, No. 17, American Institute of Physics.

(Continued)

Primary Examiner — Ryan Lepisto

(57) ABSTRACT

Provided is a semiconductor integrated circuit. The semiconductor integrated circuit includes a semiconductor pattern disposed on a substrate and including an optical waveguide part and a pair of recessed portions. The optical waveguide part has a thickness ranging from about 0.05 μm to about 0.5 μm. The recessed portions are disposed on both sides of the optical waveguide part and have a thinner thickness than the optical waveguide part. A first doped region and a second doped region are disposed in the recessed portions, respectively. The first and second doped regions are doped with a first conductive type dopant and a second conductive type dopant, respectively. An intrinsic region is formed in at least the optical waveguide part to contact the first and second doped regions.

11 Claims, 4 Drawing Sheets

U.S. PATENT DOCUMENTS

| | | | |
|---|---|---|---|
| 6,374,001 B1 * | 4/2002 | Bozeat et al. | 385/8 |
| 6,392,781 B1 | 5/2002 | Kim et al. | |
| 6,584,239 B1 * | 6/2003 | Dawnay et al. | 385/2 |
| 6,801,702 B2 * | 10/2004 | Day | 385/130 |
| 6,845,198 B2 * | 1/2005 | Montgomery et al. | 385/50 |
| 7,280,712 B2 * | 10/2007 | Liu | 385/3 |
| 7,659,155 B2 * | 2/2010 | Anderson et al. | 438/180 |
| 2006/0008223 A1 * | 1/2006 | Gunn et al. | 385/129 |
| 2006/0039666 A1 * | 2/2006 | Knights et al. | 385/129 |
| 2006/0110091 A1 * | 5/2006 | Day | 385/8 |
| 2006/0215949 A1 * | 9/2006 | Lipson et al. | 385/2 |

FOREIGN PATENT DOCUMENTS

| | | |
|---|---|---|
| JP | 07-045811 A | 2/1995 |
| JP | 08-264748 A | 10/1996 |
| KR | 1020050047923 A | 5/2005 |
| KR | 100772538 B1 | 10/2007 |

OTHER PUBLICATIONS

Ching Eng Png et al., "Optical Phase Modulators for MHz and GHz Modulation in Silicon-On-Insulator (SOI)," Journal of Lightwave Technology, Jun. 2004, pp. 1573-1582, vol. 22, No. 6, IEEE.

Ansheng Liu et al., "A high-speed silicon optical modulator based on metal—oxide—semiconductor capacitor," Nature, Feb. 12, 2004, pp. 615-618, vol. 427, Nature Publishing Group.

Ansheng Liu et al., "High-speed optical modulation based on carrier depletion in a silicon waveguide," 2007, pp. 660-668, vol. 15, No. 2, Optical Society of America.

International Search Report for PCT/KR2008/003103 filed Jun. 3, 2008.

Written Opinion of the International Searching Authority for PCT/KR2008/003103 filed Jun. 3, 2008.

\* cited by examiner

[Fig. 1]
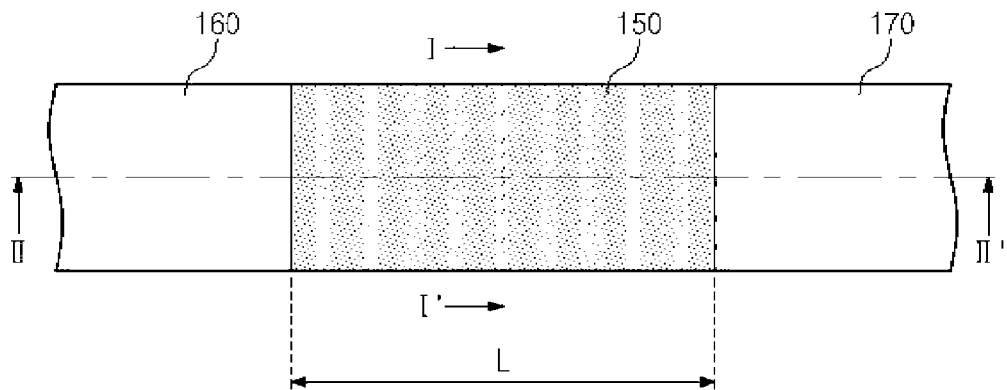
[Fig. 2]
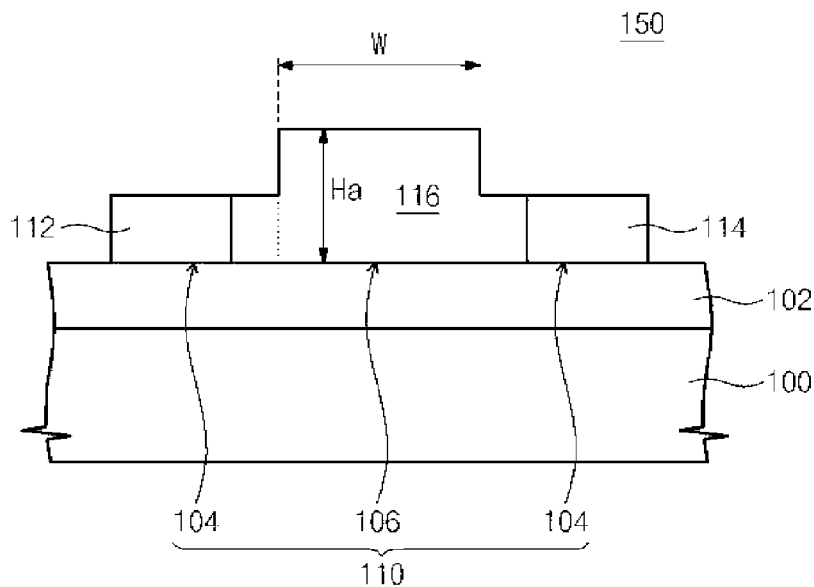
[Fig. 3]
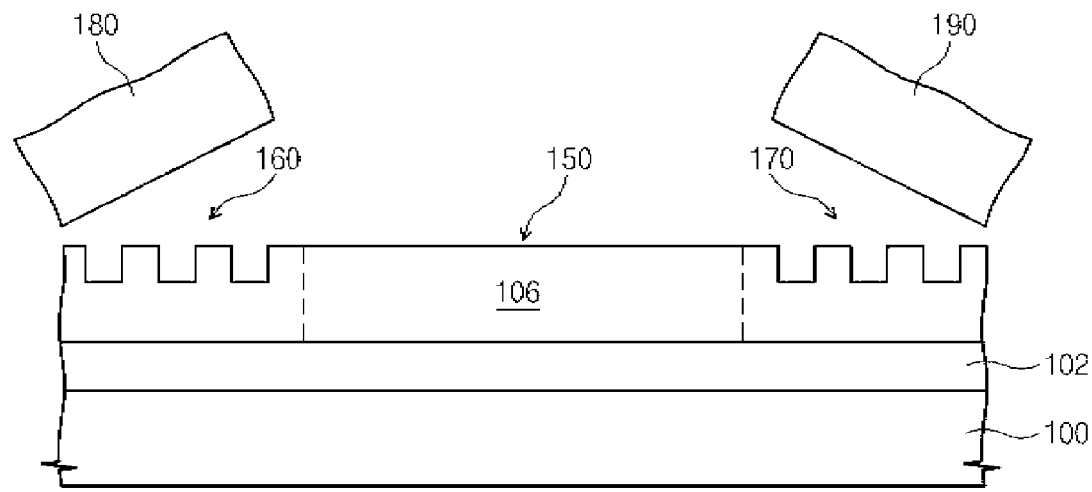

[Fig. 4]
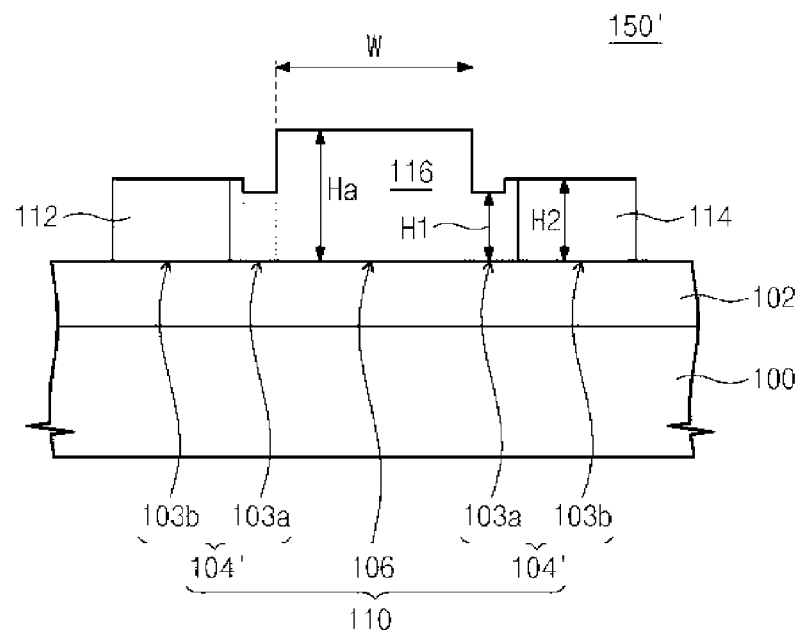
[Fig. 5]
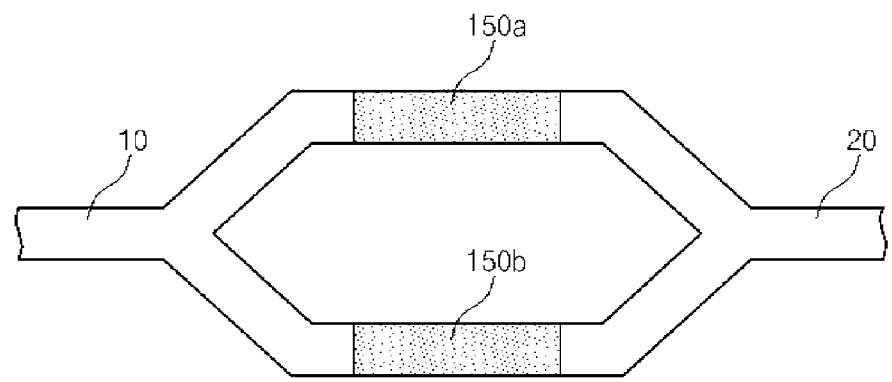
[Fig. 6]
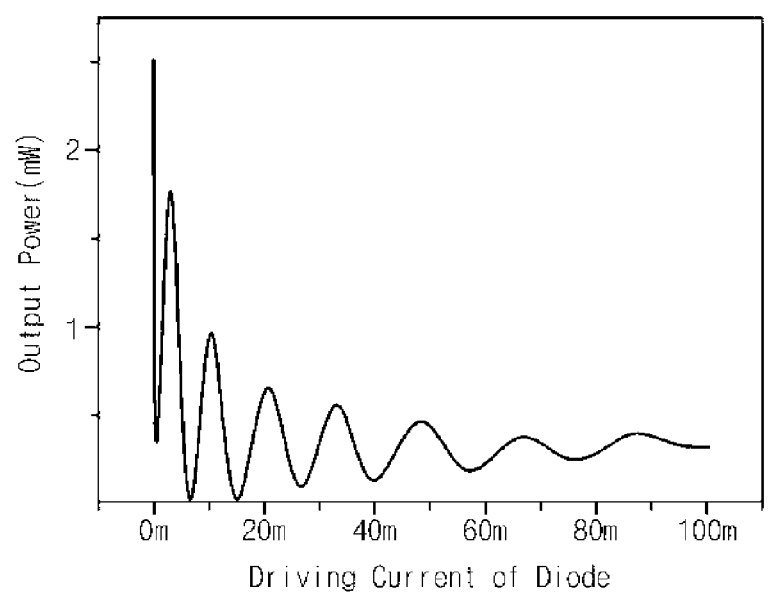

[Fig. 7]
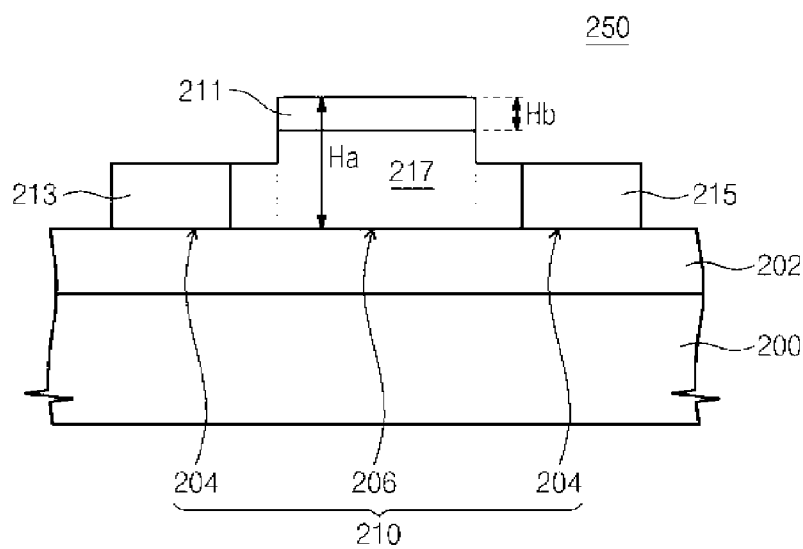
[Fig. 8]
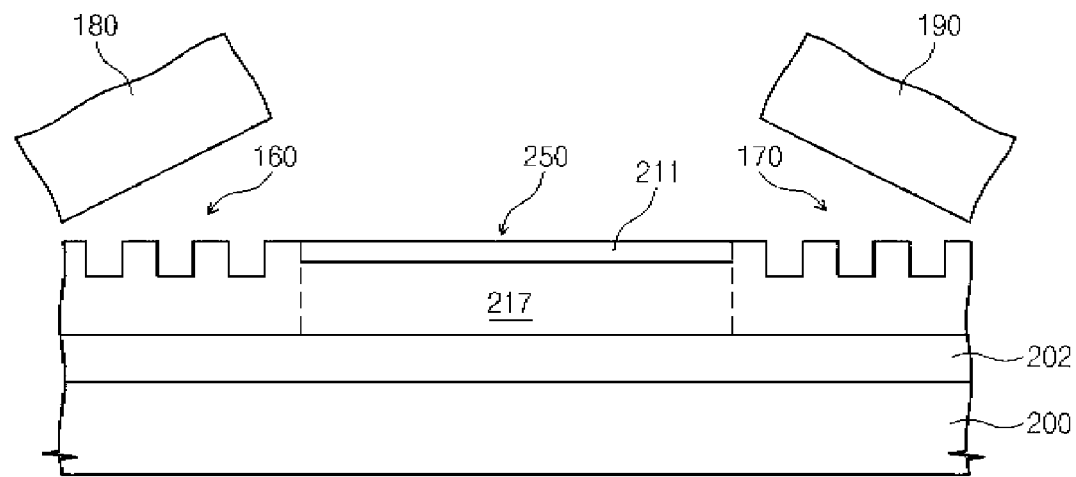

[Fig. 9]
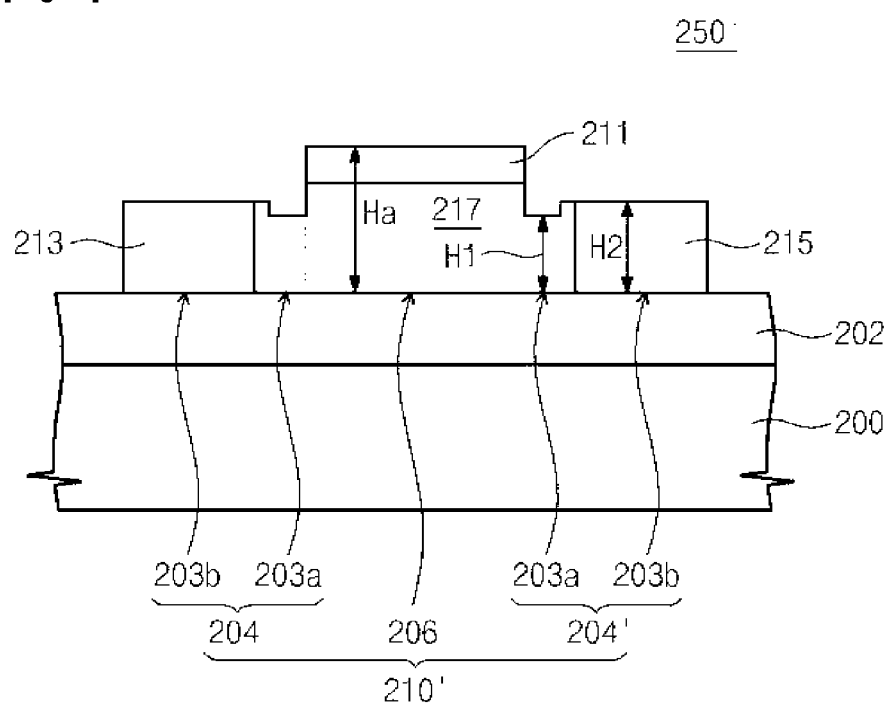

SEMICONDUCTOR INTEGRATED CIRCUITS INCLUDING OPTOELECTRONIC DEVICE FOR CHANGING OPTICAL PHASE

TECHNICAL FIELD

The present invention disclosed herein relates to a semiconductor integrated circuit, and more particularly, to a semiconductor integrated circuit including an electrooptic device for modulating an optical phase.

BACKGROUND ART

The present invention has been derived from research undertaken as a part of the information technology (IT) R & D program of the Ministry of Information and Communication and Institution of Information Technology Association (MIC/ITTA) [2006-S-004-02], silicon-based very high speed optical interconnection IC.

As a semiconductor industry is developed, semiconductor integrated circuits such as a logic device (e.g., a central processing unit or a graphic processing unit etc.) and a memory device become faster more and more. However, a communication speed between the semiconductor integrated circuits may have its limitation. Typically, the semiconductor integrated circuits may exchange data and/or signal through an electrical communication that electrically transmits and receives data and/or signal. For example, the semiconductor integrated circuits may be mounted on a printed circuit board and may perform an electrical communication through wirings in the printed circuit board. In this case, there may be limitations in reducing an electrical resistance (e.g., a resistance between a pad of a semiconductor integrated circuit and an external terminal of a package, a contact resistance between a package and a printed circuit board and/or a wiring resistance of a printed circuit board) between the semiconductor integrated circuits. Additionally, an electrical communication may be affected by external electromagnetic waves. Due to the above factors, it is difficult to increase a communication speed between the semiconductor integrated circuits.

Recently, an optical communication was suggested as one plan for improving a communication speed between semiconductor integrated circuits. The optical communication may transmit and receive an optical signal where information is stored. The optical communication may reduce interference of external electromagnetic waves, compared to the electrical communication, and also can process a large amount of data simultaneously.

Among the semiconductor integrated circuits, an electrooptic device is used for an optical communication and/or an optical connection that connects optical signals. Some of the electrooptic devices convert a phase of an optical signal. A phase of an optical signal may be an important factor determining data stored on the optical signal. Therefore, an electrooptic device for changing a phase of an optical signal may deliver an optical signal or convert an optical signal into an electric signal.

Recently, as industry is highly developed, demands for high speed, low power consumption, and/or miniaturization of electronic products including semiconductor integrated circuits are gradually increased. Accordingly, research for improving characteristics of an electrooptic device has been actively under development.

DISCLOSURE OF INVENTION

Technical Problem

The present invention provides a semiconductor integrated circuit optimized for the high degree of integration and/or low power consumption.

The present invention also provides a semiconductor integrated circuit capable of reducing the length of an electrooptic device.

Technical Solution

Embodiments of the present invention provide semiconductor integrated circuits may includes: a semiconductor pattern disposed on a substrate and including an optical waveguide part and a pair of recessed portions, the optical waveguide part having a thickness ranging from about 0.05 µm to about 0.5 µm, the recessed portions disposed on both sides of the optical waveguide part and having a thinner thickness than the optical waveguide part; a first doped region and a second doped region disposed in the recessed portions, respectively, the first doped region being doped with a first conductive type dopant, and the second being doped region doped with a second conductive type dopant; and an intrinsic region formed in at least the optical waveguide part to contact the first and second doped regions.

In some embodiments, each of the recessed portions may include a first portion having a first thickness and a second portion having a second thickness, the first portion being disposed between the optical waveguide part and the second portion, the first thickness being less than the second thickness.

In other embodiments, the first and second doped regions may be formed in the second portions of the recessed portions, respectively. And the intrinsic region may extend into the recessed portions between the optical waveguide part and the first doped region and between the optical waveguide part and the second doped region.

In still other embodiments, an optical signal transmitted through the optical waveguide part may be a single mode.

In even other embodiments, the semiconductor integrated circuit may further include a cladding layer interposed between the semiconductor pattern and the substrate.

In yet other embodiments, a refractive index of the optical waveguide part may vary by controlling a concentration of carriers in the optical waveguide part.

In further embodiments, the semiconductor integrated circuit may further include at least one grating coupler connected to at least one of an input terminal and an output terminal of the optical waveguide part.

In other embodiments of the present invention, a semiconductor integrated circuit may include: a semiconductor pattern disposed on a substrate and including an optical waveguide part and a pair of recessed portions, the optical waveguide part having the thickness ranging from about 0.05 µm to about 0.5 µm, the recessed portions disposed on both sides of the optical waveguide part and having the thinner thickness than the optical waveguide part; a first doped region formed in an upper portion of the waveguide part and doped with a first conductive type dopant; second and third doped regions formed in the respective recessed portions and doped with a second conductive type dopant; and an intrinsic region formed in the semiconductor pattern between the first, second, and third doped regions to contact the first, second, and third doped regions.

In some embodiments, each of the recessed portions may include a first portion having a first thickness and a second portion having a second thickness. The first portion is disposed between the optical waveguide part and the second portion and the first thickness is less than the second thickness.

In other embodiments, the second and third doped regions may be formed in the second portions of the recessed portions, respectively.

In still other embodiments, the first doped region may include a thickness ranging from about 0.001 μm to about 0.15 μm.

In even other embodiments, an optical signal transmitted through the optical waveguide part may be a single mode.

In yet other embodiments, the semiconductor integrated circuit may further include a cladding layer interposed between the semiconductor pattern and the substrate.

In further embodiments, a refractive index of the optical waveguide part may vary by controlling a concentration of carriers in the optical waveguide part.

In still further embodiments, the semiconductor integrated circuit may further include at least one grating coupler connected to at least one of an input terminal and an output terminal of the optical waveguide part.

Advantageous Effects

As described above, an electrooptic device of the present invention includes an optical waveguide part of a thin thickness. Accordingly, when an optical signal passes through the optical waveguide part, a required distance for modulating a phase of an optical signal is reduced. As a result, an electrooptic device of the high degree of integration and/or low power consumption can be realized by reducing the length of the optical waveguide part.

BRIEF DESCRIPTION OF THE DRAWINGS

The accompanying figures are included to provide a further understanding of the present invention, and are incorporated in and constitute a part of this specification. The drawings illustrate exemplary embodiments of the present invention and, together with the description, serve to explain principles of the present invention. In the figures:

FIG. 1 is a plan view of a semiconductor integrated circuit including an electrooptic device according to one embodiment of the present invention;

FIG. 2 is a sectional view taken along line I-I' of FIG. 1;

FIG. 3 is a sectional view taken along line II-II' of FIG. 1;

FIG. 4 is a sectional view taken along line I-I' of FIG. 1 to illustrate a modification of an electrooptic device of FIG. 2;

FIG. 5 is a plan view of a semiconductor integrated circuit according to one embodiment of the present invention.

FIG. 6 is a graph illustrating characteristics of an electrooptic device according to one embodiment of the present invention;

FIG. 7 is a sectional view illustrating a semiconductor integrated circuit including an electrooptic device according to another embodiment of the present invention;

FIG. 8 is a sectional view taken along a length direction of an optical waveguide part of FIG. 7; and FIG. 9 is a sectional view of one modification of FIG. 7.

BEST MODE FOR CARRYING OUT THE INVENTION

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the dimensions of layers and regions are exaggerated for clarity of illustration. It will also be understood that when a layer (or film) is referred to as being 'on' another layer or substrate, it can be directly on the other layer or substrate, or intervening layers may also be present. Further, it will be understood that when a layer is referred to as being 'under' another layer, it can be directly under, and one or more intervening layers may also be present. In addition, it will also be understood that when a layer is referred to as being 'between' two layers, it can be the only layer between the two layers, or one or more intervening layers may also be present. Like reference numerals refer to like elements throughout.

First Embodiment

FIG. 1 is a plan view of a semiconductor integrated circuit including an electrooptic device according to one embodiment of the present invention. FIG. 2 is a sectional view taken along line I-I' of FIG. 1. FIG. 3 is a sectional view taken along line II-II' of FIG. 1.

Referring to FIGS. 1 through 3, an electrooptic device 150 is disposed on a substrate 100. The substrate 100 may be a silicon substrate. The electrooptic device 150 includes a semiconductor pattern 110. The semiconductor pattern 110 includes an optical waveguide part 106 extending along a first direction and a pair of recessed portions 104 disposed on both sides of the optical waveguide part 106. The optical waveguide part 106 is a region where an optical signal passes. The recessed portions 104 extend along the first direction. The recessed portions 104 are connected to the both sides of the optical waveguide part 106. The optical waveguide part 106 and the recessed portions 104 may be integrated into one body. The recessed portions 104 may have the thickness thinner than the thickness Ha of the optical waveguide part 106. That is, the top surfaces of the recessed portions 104 may be lower than that of the optical waveguide part 106. The top surfaces of the recessed portions 104 may be flat. The semiconductor pattern 110 may be formed of silicon.

The electrooptic device 150 includes a first doped region 112 and a second doped region 114, which are respectively formed on the pair of recessed portions 104. The first doped region 112 and the second doped region 114 are spaced apart from each other along a second direction perpendicular to the first direction. The first direction corresponds to an x-axis of FIG. 1, and the second direction corresponds to a y-axis of FIG. 1. The first and second directions are parallel to the top surface of the substrate 100.

The first doped region 112 is doped with a first conductive type dopant, and the second doped region 114 is doped with a second conductive type dopant. That is, the first and second doped regions 112 and 114 are doped with different dopants from each other. For example, the first doped region 112 may be doped with p-type dopants and the second doped region 114 may be doped with n-type dopants. Alternatively, the first doped region 112 may be doped with n-type dopants and the second doped region 114 may be doped with p-type dopants. The bottom surfaces of the first and second doped regions 112 and 114 may have the same height as the bottom surface of the semiconductor pattern 110. Alternatively, the bottom surfaces of the first and second doped regions 112 and 114 may be higher than that of the semiconductor pattern 110.

An intrinsic region 116 is formed in at least the optical waveguide part 106. The intrinsic region 116 contacts the first and second doped regions 112 and 114. As illustrated in FIG. 2, the first and second doped regions 112 and 114 may be spaced apart from the optical waveguide part 106. In this case, the intrinsic region 116 extends toward the recessed portions 104 between the optical waveguide part 106 and the first doped region 112 and between the optical waveguide part 106 and the second doped region 114.

The first doped region 112, the intrinsic region 116, and the second doped region 114 constitute a diode. A refractive index of the optical waveguide part 106 varies by controlling a concentration of carriers (ex, electrons or holes) in the optical waveguide part 106. For example, as the concentration of carriers in the optical waveguide part 106 increases, the refractive index of the optical waveguide part 106 may increase. The concentration of carriers in the optical waveguide part 106 can be controlled by adjusting an amount of a driving current of the diode. A phase of an optical signal transmitting the optical waveguide part 106 can be shifted by controlling the refractive index of the optical waveguide 106. The optical signal transmitting the optical waveguide part 106 may be a single mode. That is, the width W and thickness Ha of the optical waveguide part 106 and the thickness of the recessed portions 104 may be adjusted to allow an optical signal of a single mode to be transmitted.

A cladding layer 102 may be disposed between the semiconductor pattern 110 and the substrate 100. The cladding layer 102 may be disposed on entire surface of the substrate 100. The semiconductor pattern 110 is disposed on the cladding layer 102. The cladding layer 102 may be formed of a material having a different refractive index than the semiconductor pattern 110. For example, the cladding layer 102 may be formed of oxide. The cladding layer 102 may be a buried oxide layer in a SOI (Silicon-On-Insulator) substrate. In this case, the semiconductor pattern 102 may be formed by patterning a silicon layer on the buried oxide layer in the SOI substrate. Unlike this, the cladding layer 102 may be formed by implanting oxygen ions into a predetermined depth of a bulk semiconductor substrate. In this case, the semiconductor pattern 110 may be formed by patterning a portion of the bulk semiconductor substrate disposed on the cladding layer 102.

The optical waveguide part 106 has the thickness Ha, the length L in the first direction, and the width W in the second direction. At this point, the thickness Ha of the optical waveguide part 106 may range from about 0.05 μm to about 0.5 μm. That is, the optical waveguide part 106 have a thin thickness. Accordingly, a distance in the first direction, which is required to shift a phase of an optical signal transmitted through the optical waveguide part 106, can be reduced. As a result, a semiconductor integrated circuit including an electrooptic device optimized for the high degree of integration can be realized by reducing the length L of the optical waveguide part 106. Additionally, the sectional area of the optical waveguide part 106 is reduced by the thin thickness Ha of the optical waveguide part 106. Accordingly, the concentration of carriers in the optical waveguide 106 can be increased. As a result, because an amount of a driving current of the diode can be reduced, a semiconductor integrated circuit including an electrooptic device optimized for low power consumption can be realized.

The electrooptic device 150 may include an input terminal and an output terminal. A first grating coupler 160 may be connected to the input terminal of the electrooptic device 150. The first grating coupler 160 includes an input transmission region and an input grating. The input grating is disposed on the surface of the input transmission region. The input transmission region may be formed of a semiconductor. A first optical fiber 180 may be disposed over the first grating coupler 160. An optical signal projected from the first optical fiber 180 passes through the input grating and then is provided to the input transmission region. At this point, due to the input grating, an optical signal in the input transmission region is inputted to the electrooptic device 150 in the direction (x-axis) parallel to the top surface of the substrate 100.

A second grating coupler 170 may be connected to an output terminal of the electrooptic device 150. The second grating coupler 170 includes an output transmission region and an output grating. The output grating is disposed on the top surface of the output transmission region. The output transmission region may be formed of a semiconductor. A second optical fiber 190 may be disposed on the second grating coupler 170. An optical signal having a shifted phase caused by transmitting the electrooptic device 150 passes through the output transmission region and the output grating and then is provided to the second optical fiber 190. The optical signal supplied to the second optical fiber 190 may be supplied to another semiconductor chip and/or another electronic medium.

Although the sectional area of the electrooptic device 150 is reduced, due to the first and second grating couplers 160 and 170, the electrooptic device 150 can minimize coupling loss in other optical waveguide parts such as the first and second optical fibers 180 and 190.

The present invention is not limited to the above. For example, another form of an optical waveguide (e.g., a semiconductor optical waveguide) may be connected to an input terminal of the electrooptic device 150. Additionally, another form of an optical waveguide may be connected to an output terminal of the electrooptic device 150.

On the other hand, one modification of the electrooptic device 150 will be described with reference to FIG. 4.

FIG. 4 is a sectional view taken along line I-I' of FIG. 1 to illustrate one modification of the electrooptic device 150 of FIG. 2.

Referring to FIG. 4, the electrooptic device 150' includes a semiconductor pattern 110' disposed on a cladding layer 102. The semiconductor pattern 110' includes an optical waveguide part 106 and a pair of recessed portions 104' disposed on both sides of the optical waveguide part 106. The recessed portions 104' may have the thinner thickness than the optical waveguide part 106. The optical waveguide part 106 and the recessed portions 104' extend along a first direction, and the pair of recessed portions 104' are spaced part from each other in a second direction perpendicular to the first direction. The recessed portions 104' is connected to both sides of the optical waveguide part 106. The optical waveguide part 106 and the recessed portions 104' may be integrated into one body.

Each of the recessed portions 104' includes a first portion 103a having the first thickness H1 and a second portion 103b having the second thickness H2. The first portion 103a is interposed between the optical waveguide part 106 and the second portion 103b. At this point, the first thickness H1 may be thinner than the second thickness H2. That is, the top surface of the first portion 103a is lower than that of the second portion 103b. Therefore, a pair of grooves is respectively disposed on both sides adjacent to the optical waveguide part 106. The top surface of the first portion 103a corresponds to the bottom surface of the groove.

First and second doped regions 112 and 114 are respectively formed in the second portions 103b of the pair of recessed portions 104. An intrinsic region 116 is formed in the optical waveguide part 106. The intrinsic region 116 extends into the first portions 103a to contact the first and second doped region 112 and 114.

The width and thickness Ha of the optical waveguide part 106 and the first thickness H1 of the first portion 103a are adjusted to allow an optical signal of a single mode to transmit the optical waveguide part 106. At this point, the second thickness H2 of the second portions 103b may be thicker than the first thickness H1 of the first portion 103a. Accordingly, the first and second doped regions 112 and 114 in the second portions 103b may have the sufficient thickness. As a result, resistances of the first and second doped regions 112 and 114 are reduced, such that an operating speed of a diode including the first and second doped regions 112 and 114 and the intrinsic region 116 can be improved.

Consequently, the first portions 103a of the recessed portions 104' adjacent to the optical waveguide part 106 have the relatively thin thickness, so that an optical signal of a single mode may transmit the optical waveguide part 106, and the second portions 103b of the recessed portions 104' have the relatively thick thickness, so that resistance of the first and second doped regions 112 and 114 can be reduced. Therefore, an electrooptic device 150' operating at high speed can be realized.

The semiconductor integrated circuit includes at least one of an electronic device such as a central processing unit, a memory device and an optical device such as an optical logic device. At this point, the electrooptic device 150 or 150' may be included in the optical device or may be disposed between devices in the semiconductor integrated circuit. The electrooptic device 150 or 150' may be used for an optical communication or an optical connection in the semiconductor integrated circuit. Unlike this, the electrooptic device 150 or 150' may be used for an optical communication and an optical connection between the semiconductor integrated circuit and external medium (e.g., another electronic device chip or another optical device chip).

The semiconductor integrated circuit may be realized in various forms. For example, the electrooptic device 150 or 150' may be used as a phase shifter of a Mach-Zhender Interferometer. This will be described with reference to the following drawings.

FIG. 5 is a plan view of a semiconductor integrated circuit according to one embodiment of the present invention.

Referring to FIG. 5, the Mach-Zhender Interferometer includes an input Y-branch 10, a first electrooptic device 150a, a second electrooptic device 150b, and an output Y-branch 20. The first and second electrooptic devices 150a and 150b are connected between tow arms of the input Y-branch 10 and two arms of the output Y-branch 20. The first and second electrooptic devices 150a and 150b may be the electrooptic device 150 of FIG. 2 or the electrooptic device 150 of FIG. 4.

An optical signal incident to the input Y-branch 10 is diverged at a diverging point of the input Y-branch 10 and then transmits the first and second electrooptic devices 150a and 150b, respectively. The optical signals transmitting the first and second electrooptic devices 150 and 150b are converged at the diverging point of the output Y-branch 20. According to whether one of the first and second electrooptic devices 150 and 150b operates or not, when the optical signals transmitting the first and second electrooptic devices 150 and 150b are converged, destructive interference or constructive interference occurs. Therefore, an optical signal can be modulated.

On the other hand, an experiment was performed to identify characteristics of the electrooptic device according to one embodiment of the present invention. For the experiment, the Mach-Zhender Interferometer of FIG. 5 was used. At this point, the first and second electrooptic devices 150a and 150b of the Mach-Zhender Interferometer were formed to have the same shape as the electrooptic device 150 of FIG. 2. The thickness Ha, width W, and length L of the optical waveguide part 106 of the first and second electrooptic devices 150a and 150b were about 0.22 μm, about 0.5 μm, and about 1000 μm, respectively. The thickness of the recessed portions 104 in the first and second electrooptic devices 150a and 150b was about 0.1 μm, and the thickness of the cladding layer 102 was about 1 μm. The second electrooptic device 150b was not operated, and only the first electrooptic device 150a was operated. In more detail, an output power of an optical signal, outputted through the output Y-branch 20, was measured with changing an amount of a driving current of a diode in the first electrooptic device 150a. The result of the above experiment is illustrated in FIG. 6.

FIG. 6 is a graph illustrating characteristics of an electrooptic device according to one embodiment of the present invention.

Referring to FIG. 6, in the graph, an x-axis represents an amount of a diode driving current of the first electrooptic device 150a, and a y-axis represents an output power of an optical signal outputted through the output Y-branch 20. An amount of a diode driving current of the first electrooptic device 150a was changed from about 0 mA to about 100 mA. In a case where an amount of a diode driving current of the first electrooptic device 150a was about 0 mA, the first and second electrooptic devices 150a and 150b did not operate. Therefore, optical signals transmitting the first and second electrooptic devices 150a and 150b were outputted at a high power due to constructive interference. The total 15 inflection points (the sum of the number of vertexes and bases) occurred in an interval between 0 mA and 100 mA. Considering that, a phase of an optical signal may be changed by a total of 15π at the driving current of 100 mA during passing through the optical waveguide part 106 of about 1000 μm. Accordingly, when an amount of a driving current of a diode was about 100 mA, an about 67 μm length for the optical waveguide part 106 in the electrooptic device 150a was required to shift a phase of the optical signal by π. Consequently, by controlling the thickness of the optical waveguide part 106 to be below about 0.5 μm, the optical waveguide part 106 requires an about 100 μm length to shift a phase of an optical signal by π.

Second Embodiment

FIG. 7 is a sectional view illustrating a semiconductor integrated circuit including an electrooptic device according to another embodiment of the present invention. FIG. 8 is a sectional view taken along a length direction of an optical waveguide part of FIG. 7.

Referring to FIGS. 7 and 8, a cladding layer 202 is disposed on the entire surface of a substrate 200, and an electrooptic device 250 is disposed on the cladding layer 202. The electrooptic device 250 includes a semiconductor pattern 200 on the cladding layer 202. The semiconductor pattern 210 includes an optical waveguide part 206 extending along a first direction and a pair of recessed portions 204 disposed on both sides of the optical waveguide part 206. The recessed portions 204 extend along the first direction. The recessed portions 204 may have the thickness thinner than the thickness Ha of the optical waveguide part 206. The recessed portions 204 are connected to both sides of the optical waveguide part 206. The optical waveguide part 206 and the recessed portions 204 may be integrated into one body. The top surfaces of the recessed portions 204 may be flat. The semiconductor pattern 210 may be formed of silicon. The cladding layer 202 may be formed of a material, i.e., an oxide layer, having a different refractive index than the semiconductor pattern 210.

The electrooptic device 250 includes first, second, and third doped regions 211, 213, and 215 and an intrinsic region 217. The first doped region 211 is formed on an upper portion of the optical waveguide part 206. The second and third doped regions 213 and 215 are formed in the pair of recessed regions 205, respectively. The second and third doped regions 213 and 215 are spaced part from each other in a second direction perpendicular to the first direction. The first and second directions are parallel to the top surface of the substrate 200. The intrinsic region 217 is formed in the semiconductor pattern 210 between the first, second, and third doped regions 211, 213, and 215. The intrinsic region 217 contacts the first, second, and third doped regions 211, 213, and 215.

The first doped region 211 is doped with a first conductive type dopant. The second and third doped regions 213 and 215 are doped with a second conductive type dopant. For example, the first doped region 211 may be doped with an n-type dopant, and the second and third doped regions 213 and 215 may be doped with a p-type dopant. On the contrary, the first doped region 211 may be doped with a p-type dopant, and the second and third doped regions 213 and 215 may be doped with an n-type dopant. The bottom surfaces of the second and third doped regions 213 and 215 may contact the cladding layer 202. Unlike this, the second and third doped regions 213 and 215 may be disposed higher than the top surfaces of the cladding layer 202. The first, second, and third doped regions 211, 213, and 215 and the intrinsic region 217 constitute a diode. During an operation of the diode, a first voltage is applied to the first doped region 211, and a second voltage is applied to the second and third doped regions 213 and 215. That is, the same voltage is applied to the second and third doped regions 213 and 215.

An optical signal is transmitted through the optical waveguide part 206. At this point, the thickness Ha of the optical waveguide part 206 may range from about 0.05 μm to about 0.5 μm. Accordingly, the sectional area of the optical waveguide part 206 is reduced so that a semiconductor integrated circuit including an electrooptic device of the high degree of integration and/or low power consumption can be realized. The thickness Hb of the first doped region 211 may range from about 0.001 μm to about 0.15 μm. The thickness of the optical waveguide part 206 and the thicknesses of the recessed portions 204 may be adjusted to allow an optical signal of a single mode to transmit the optical waveguide part 206.

The electrooptic device 250 includes an input terminal and an output terminal. At this point, as illustrated in FIG. 8, a first grating coupler 160 may be connected to the input terminal of the electrooptic device 250, and a second grating coupler 170 may be connected to the output terminal of the electrooptic device 250. Therefore, although the sectional area of the electrooptic device 250 is reduced, the electrooptic device 250 can minimize coupling loss with respect other waveguides such as first and second optical fibers 180 and 190. The first and second grating couplers 160 and 170 are already described in the above first embodiment, and its overlapping description will be omitted for conciseness.

The electrooptic device 250 may have different forms. This will be described with reference to FIG. 9.

FIG. 9 is a sectional view of one modification of FIG. 7.

Referring to FIG. 9, an electrooptic device 250 includes a semiconductor pattern 210' disposed on a cladding layer 202. The semiconductor pattern 210' includes an optical waveguide part 206 and a pair of recessed portions 204' disposed on both sides of the optical waveguide part 206. The optical waveguide part 206 and the recessed portions 204' extend parallel along a first direction, and may be integrated as one body. Each of the recessed portions 204' includes a first portion 203a having the first thickness H1 and a second portion having the second thickness H2. The first portion 203a is interposed between the optical waveguide part 206 and the second portion 203b. Therefore, grooves are formed at the both sides adjacent to the optical waveguide part 206. The top surface of the first portion 203a corresponds to the bottom surface of the groove.

A first doped region 211 is formed on an upper portion of the optical waveguide part 206, and the second and third doped regions 213 and 215 are formed at the second portions 203b of the recessed regions 205, respectively.

The first thickness H1 of the first portion 203a and the thickness Ha of the optical waveguide part 206 are adjusted to allow an optical signal of a single mode to transmit the optical waveguide part 206. At this point, the first thickness H1 of the first portions 203a may be thin. Unlike this, the second portions 203b where the second and third doped regions 213 and 215 are formed are sufficiently thickly formed. Accordingly, the thickness of the second third doped regions 213 and 215 can be increased. As a result, by reducing resistances of the second and third doped regions 213 and 215, an operating speed of the diode can be improved.

The semiconductor integrated circuit includes at least one of an electronic device such as a central processing unit and a memory device and an optical device such as an optical logic device. At this point, the electrooptic device 250 or 250' may be included in the optical device or may be disposed between devices in the semiconductor integrated circuit. The electrooptic device 250 or 250' may be used for an optical communication or an optical connection in the semiconductor integrated circuit. Unlike this, the electrooptic device 250 or 250' may be used for an optical communication and an optical connection between the semiconductor integrated circuit and external medium (e.g., another electronic device chip or another optical device chip).

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A semiconductor integrated circuit comprising:
   a semiconductor pattern disposed on a substrate and including an optical waveguide part and a pair of recessed portions, the optical waveguide part having the thickness ranging from about 0.05 μm to about 0.5 μm, the recessed portions disposed on both sides of the optical waveguide part having the thinner thickness than the optical waveguide part;
   a first doped region formed in an upper portion of the waveguide part and doped with a first conductive type dopant;
   second and third doped regions formed in the recessed portion, respectively, and doped with a second conductive type dopant; and
   an intrinsic region formed in the semiconductor pattern between the first, second, and third doped regions to contact the first, second, and third doped regions, wherein each of the recessed portions includes a first portion having a first thickness and a second portion having a second thickness, the first portion being disposed between the optical waveguide part and the second portion, the first thickness being less than the second thickness, and wherein the second and third doped regions are formed in the second portions of the recessed portions, respectively.

2. The semiconductor integrated circuit of claim 1, wherein the first doped region comprises a thickness ranging from about 0.001 µm to about 0.15 µm.

3. The semiconductor integrated circuit of claim 1, wherein an optical signal transmitted through the optical waveguide part is a single mode.

4. The semiconductor integrated circuit of claim 1, further comprising a cladding layer interposed between the semiconductor pattern and the substrate.

5. The semiconductor integrated circuit of claim 1, wherein a refractive index of the optical waveguide part varies by controlling a concentration of carriers in the optical waveguide part.

6. The semiconductor integrated circuit of claim 1, further comprising at least one grating coupler connected to at least one of an input terminal and an output terminal of the optical waveguide part.

7. A semiconductor integrated circuit comprising:
a semiconductor pattern disposed on a substrate and including an optical waveguide part and a pair of recessed portions, the optical waveguide part having a thickness ranging from about 0.05 µm to about 0.5 µm, the recessed portions disposed on both sides of the optical waveguide part and having a thinner thickness than the optical waveguide part;

a first doped region and a second doped region disposed in the pair of recessed portions, respectively, the first doped region being doped with a first conductive type dopant and the second doped region being doped with a second conductive type dopant; and an intrinsic region formed in at least the optical waveguide part to contact the first and second doped regions, wherein each of the recessed portions includes a first portion having a first thickness and a second portion having a second thickness, the first portion being disposed between the optical waveguide part and the second portion, the first thickness being less than the second thickness, wherein the first and second doped regions are formed in the second portions of the recessed portions, respectively, and wherein the intrinsic region extends into the recessed portions between the optical waveguide part and the first doped region and between the optical waveguide part and the second doped region.

8. The semiconductor integrated circuit of claim 7, wherein an optical signal transmitted through the optical waveguide part is a single mode.

9. The semiconductor integrated circuit of claim 7, further comprising a cladding layer interposed between the semiconductor pattern and the substrate.

10. The semiconductor integrated circuit of claim 7, wherein a refractive index of the optical waveguide part varies by controlling a concentration of carriers in the optical waveguide part.

11. The semiconductor integrated circuit of claim 7, further comprising at least one grating coupler connected to at least one of an input terminal and an output terminal of the optical waveguide part.

* * * * *